United States Patent [19]

Ly

[11] Patent Number: 4,951,410
[45] Date of Patent: Aug. 28, 1990

[54] ELECTRONIC FISH ATTRACTOR WITH ACOUSTIC SOUNDER

[76] Inventor: Binh T. Ly, 9965 Nob Hill La., Sunrise, Fla. 33351

[21] Appl. No.: 270,646

[22] Filed: Nov. 14, 1988

[51] Int. Cl.$^5$ ............................................. A01K 97/00
[52] U.S. Cl. ......................................... 43/17.1; 43/4
[58] Field of Search ................... 43/4, 4.5, 17.1, 26.2, 43/42.22, 42.24, 42.31, 43.14

[56] References Cited

U.S. PATENT DOCUMENTS

| | | | |
|---|---|---|---|
| 2,784,399 | 3/1957 | Smith | 340/394 |
| 2,977,705 | 4/1961 | Busnel | 43/17.1 |
| 3,225,484 | 12/1965 | Richard | 43/17.1 |
| 3,414,873 | 12/1968 | Richard et al. | 43/17.1 |
| 3,680,245 | 8/1972 | Brooks | 43/17.1 |
| 3,736,690 | 6/1973 | Witkowski | 43/43.14 |
| 3,885,338 | 5/1975 | York | 43/17.1 |
| 4,223,467 | 9/1980 | Hodges, Jr. et al. | 43/42.31 |
| 4,380,132 | 4/1983 | Atkinson | 43/26.2 |
| 4,516,348 | 5/1985 | Hirose et al. | 43/4 |
| 4,583,313 | 4/1986 | Dugan, Jr. | 43/17.1 |
| 4,713,967 | 12/1987 | Overs et al. | 43/4 |
| 4,805,339 | 2/1989 | Fuentes et al. | 43/17.1 |

FOREIGN PATENT DOCUMENTS 2066031 7/1981 United Kingdom ................. 43/4

Primary Examiner—Kurt Rowan
Attorney, Agent, or Firm—Oltman and Flynn

[57] ABSTRACT

A fish attractor using an electronically driven acoustic sounder. It includes a sounding board acoustically coupled to the surrounding water, which has the acoustic sounder connected thereto. The surrounding board may be suspended from the fishing vessel or dragged behind it. It may include simulated sea weed attached to the board and a dispenser for dispensing chumming oil.

5 Claims, 3 Drawing Sheets

FIG. 4
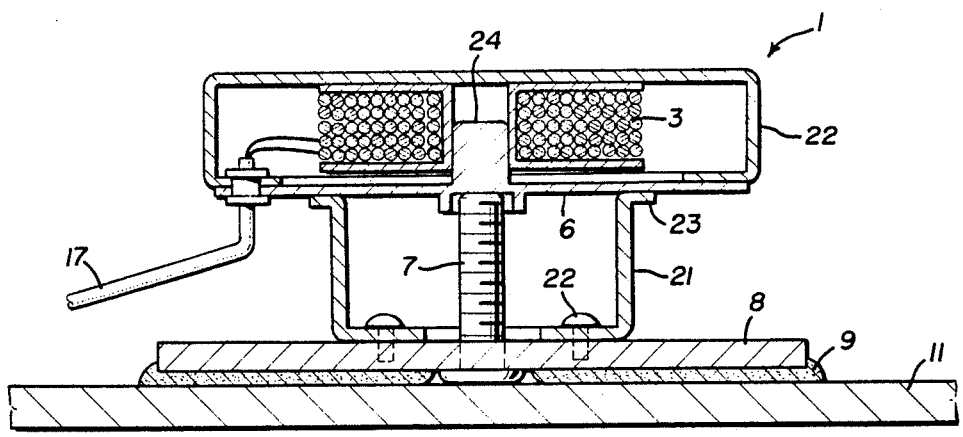
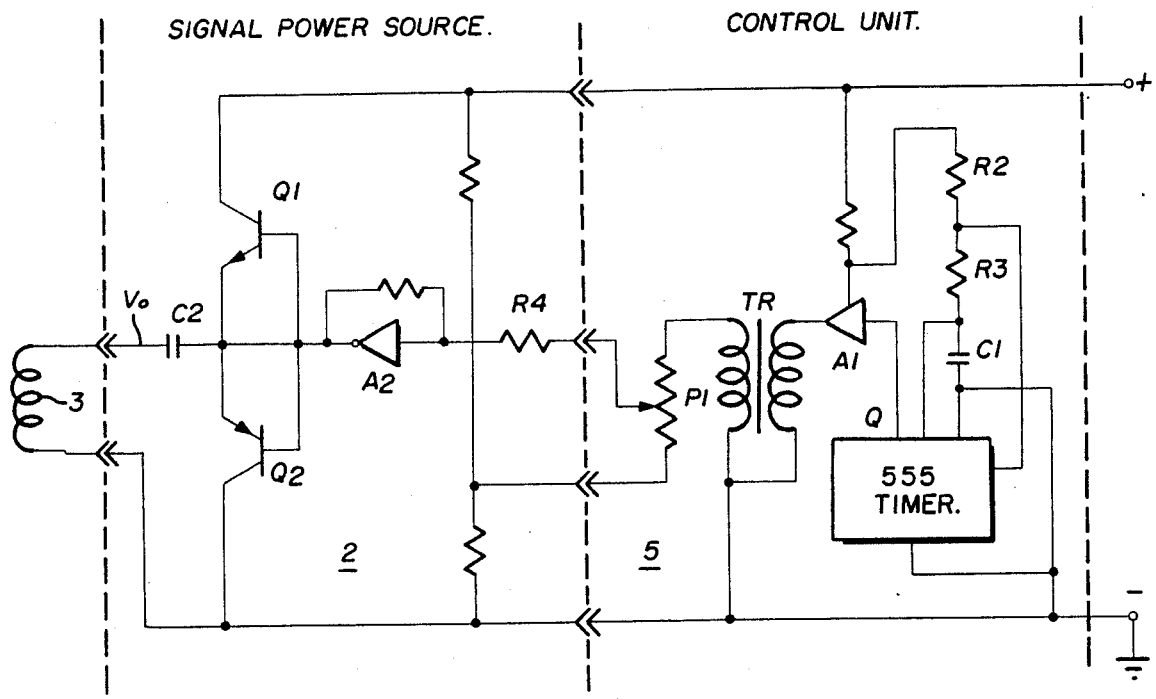
FIG. 5

ELECTRONIC FISH ATTRACTOR WITH ACOUSTIC SOUNDER

The invention relates to devices for electronically attracting fish, and more particularly to a fish attractor using an electronically driven acoustic sounder.

BACKGROUND AND PRIOR ART

It is known that a wide variety of fish, particularly large predatory fish, are attracted to low frequency pulsating sounds. Inventors have in the past created lures that make buzzing noises, sound waves or vibrations. One lure is known in which a mechanical spring-activated arrangement is provided. The lures of the known art can only produce sounds of low intensity due to their small size, and do therefore not attract fish from a satisfactory distance.

Some boat builders have sought to construct hulls of fishing boats that resonate at some low frequency to attract fish from greater distance. Such a method suffers from the drawback that the frequency and sound character is ill-defined and therefore not entirely effective.

It is known that the sound-sensing organs of fish are not nearly as sensitive as the hearing organs of most other animals, and that they sense only sound waves of low frequencies. It is therefore an object of the instant invention to provide an electronic fish attractor that overcomes the drawbacks of the known devices and provides more efficient means for attracting fish.

SUMMARY OF THE INVENTION

The instant invention is based on the principle of purposely inducing low frequency sound waves into a boat hull for boats of any size or into a suitable resonating structure, and constructed of any material such as fiberglass, wood, metal or the like. In this way a simulated "blanket" of pulsating sound waves is created. Predatory fish can sense such sound waves from great distances. It is the nature of such fish to seek the source of such sounds.

Accordingly, the electronic fish attractor includes at least one transducer for generating sound waves, a sounding board mechanically coupled to the transducer and acoustically coupled to the water containing the fish, and a low frequency electric wave power source for generating low frequency electric wave energy connected to the transducer.

According to a further feature, the sounding board may be part of the bottom of a boat.

According to another feature, the sounding board may be a separate piece of sheet material.

According to still another feature, the fish attractor may have a float chamber and/or a ballast of various degrees of weight and buoyancy so that the attractor may be towed behind a boat or suspended below the boat According to a still further feature, the attractor may be equipped with means for attaching appurtenances in the form of simulated seaweeds or the like for more effectively attracting fish.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 4 is an elevational diagrammatic cross-sectional view of a typical transducer;

FIG. 5 is a circuit diagram of the invention showing its electronic elements;

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENTS

Figure 1:
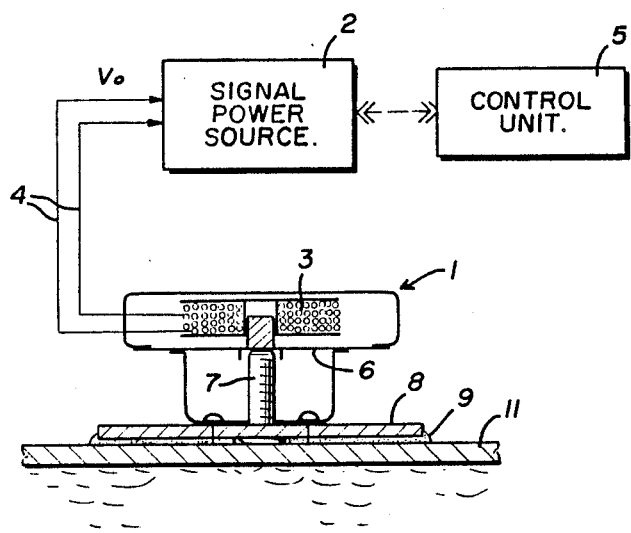
FIG. 1 is a diagrammatic cross-sectional view of the invention showing its major parts.

FIG. 1 shows a block diagram of the invention, wherein an acoustic transducer 1 operates to convert electrical energy from a signal power source 2 into mechanical vibrations. The transducer is shown in one of several possible embodiments. In the embodiment shown an inductive coil 3 is pulsed via leads 4 with a low frequency signal Vo generated by the signal power source 2. The coil 3 actuates a magnetic diaphragm 6 and sets it into oscillations that are coupled via a stainless bolt 7 to a transfer plate 8, which is in turn attached by suitable means, such as a layer 9 of epoxy cement or the like, to a sounding board 11. The sounding board 11 is in contact with water so that the mechanical vibrations are transmitted as sound waves of a suitable frequency and wave shape into the water, where the sound waves will attract the attention of fish within a range determined by the intensity and frequency of the sound waves. The sounding board 11 may suitably be part of the bottom of a boat made of, for example, fiber glass, metal or wood. The transfer plate 8 serves to provide a good degree of coupling between the transducer 1 and the sounding board 11 and is advantageously made of steel or aluminum for best sound transfer.

The transducer 1 may be constructed using other forms of conversion of electrical energy to mechanical waves; for example magnetostrictive or piezoelectric transducers have long been known and used, since any suitable type capable of handling the required power and frequency is applicable.

It follows that multiple transducers may be connected in parallel within a boat hull for increased effect and range.

Figure 2:
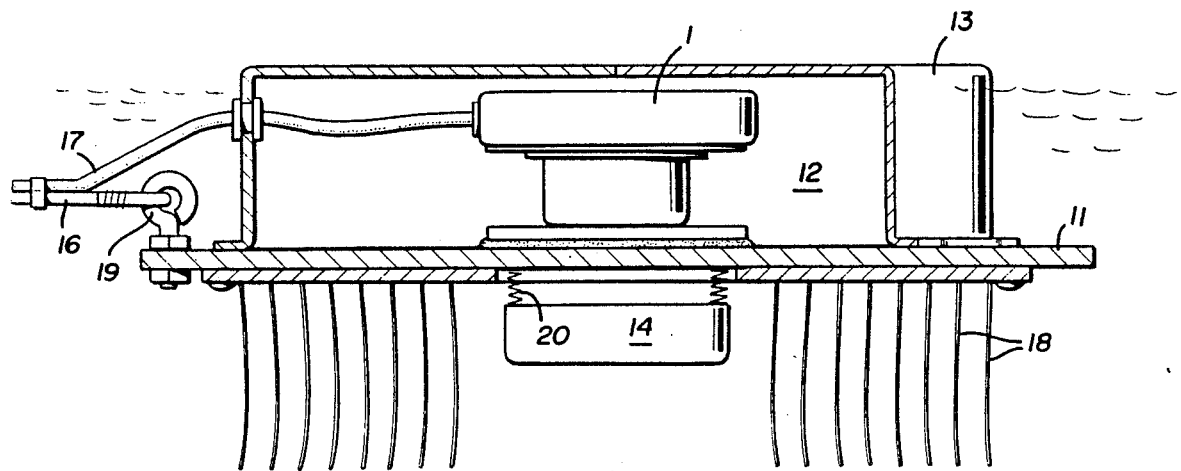
FIG. 2 is a view of the invention with part of the wall broken away to show the interior construction of a towing embodiment.

In FIG. 2 the fish attractor is arranged to be towed behind a boat. In this embodiment the sounding board 11 is a circular or rectangular sheet of suitably rigid material, such as fiber glass, aluminum, steel, plywood or the like. A transducer 1 is attached to the top side of the sounding board 11, enclosed in a flotation chamber 12 in the form of a housing 13 watertightly attached to the top side of the sounding board 11. A ballast 14 is attached by springs 20 to the bottom side of the sounding board and has a weight sufficient to maintain the entire assembly floating in upright position on the surface of the water. In this position the fish attractor may be towed behind a boat at a suitable speed by a towing line 16 attached to an eyebolt 19 and connected to the boat, not shown. An electric cable 17 connected to the signal power source 2, disposed in the boat provides the electric signal for driving the transducer 1. Fringes 18, simulating seaweed may advantageously be attached to the underside of the sounding board to make the fish attractor appear more appealing to an approaching fish.

The springs 20 may advantageously be of a stiffness such that the mass of the sounding board 11 resonates with the stiffness of the springs 20 at the selected signal frequency.

Figure 3:
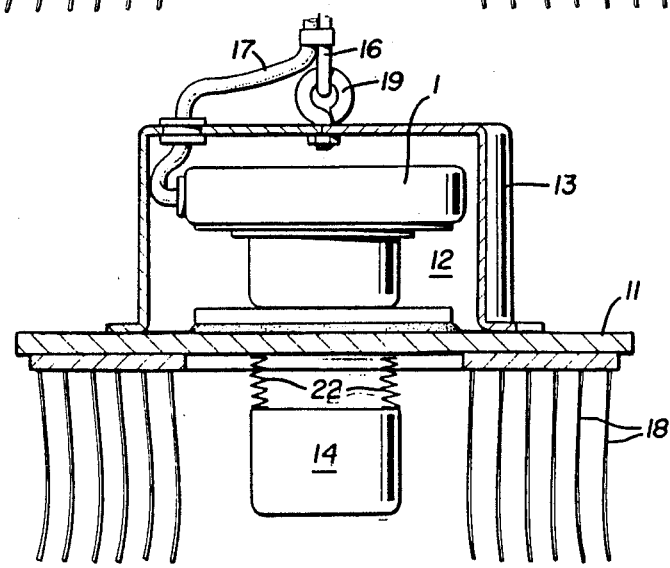
FIG. 3 is a diagrammatic cross-sectional view of the invention with part of the wall broken away to show the interior construction of a submersible embodiment.

FIG. 3 shows a submersible arrangement of the fish attractor which is similar to the one shown in FIG. 2, except it is intended to hang suspended in the water below a boat (not shown) supported by a line 16 attached to an eye bolt 19, and therefore has a ballast 14 having a weight greater than the buoyancy of the float chamber 12. The arrangement of FIG. 3 may have the same dimensions as the arrangement of FIG. 2, but may alternatively be modified to have greater dimensions in the vertical direction and lesser dimensions in the horizontal direction for more efficient vertical movement in the water.

FIG. 4 shows more details of the transducer 1 according to the electromagnetic version, shown and described briefly in connection with FIG. 1. Besides the elements shown in FIG. 1, FIG. 4 shows a cup 21, attached at its bottom by rivets or screws 22 to the transfer plate 8, and having an upper flange 23 attached to the underside of the diaphragm 6. The diaphragm 6 has attached to its top side a ferromagnetic core 24 partially inserted into the coil 3, which, when energized by electrical pulses from the signal power source 2 attracts or repels the core 24, which in turn sets the diaphragm 6 in vibrations which are transmitted via the bolt 7 to the transfer plate 8. The latter, being bonded by epoxy cement 9 to the sounding board 11 causes the vibrations to be transmitted to water in contact with the sounding board 11.

Figure 7:
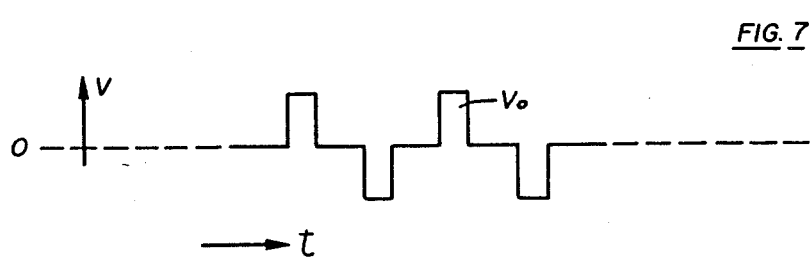
FIG. 7 is a time diagram showing the signal pulse shape.

FIG. 5 shows circuit diagrams of the signal power source 2 and a control unit 5 controlling this signal power source 2. The signal power source has an output stage consisting of complementary power transistors Q1, Q2 having commonly connected emitters connected through coupling capacitor C2 to the coil 3 of the transducer 1. Transistors Q1, Q2 have commonly connected bases connected to the output of an amplifier A2. The amplifier's input is driven through resistor R4 to a power level control potentiometer P1 that controls the level of the input signal to amplifier A2, and is part of a control unit 5, providing the drive signal for the signal power source 2. The control unit 5 has an input square wave oscillator, advantageously in the form of a so-called 555 timer, which is a well-known off-the-shelf component. The timer oscillates at a frequency determined by resistors R2, R3 and capacitor C1. The selected frequency is preferably in the low frequency range of 0–50 Hz. The output Q of the 555 timer is connected to the input of an amplifier A1, connected at its output to a small transformer TR which shapes the output signal to a signal having a relatively low duty cycle, by having a transformer core that is driven into saturation for each positive and negative half cycle. FIG. 7 shows the low duty cycle signal Vo as it appears at the output of the signal power source 2. The output power is advantageously in the power range of 5–10 watts, and a duty cycle of less than 40%.

Figure 6:
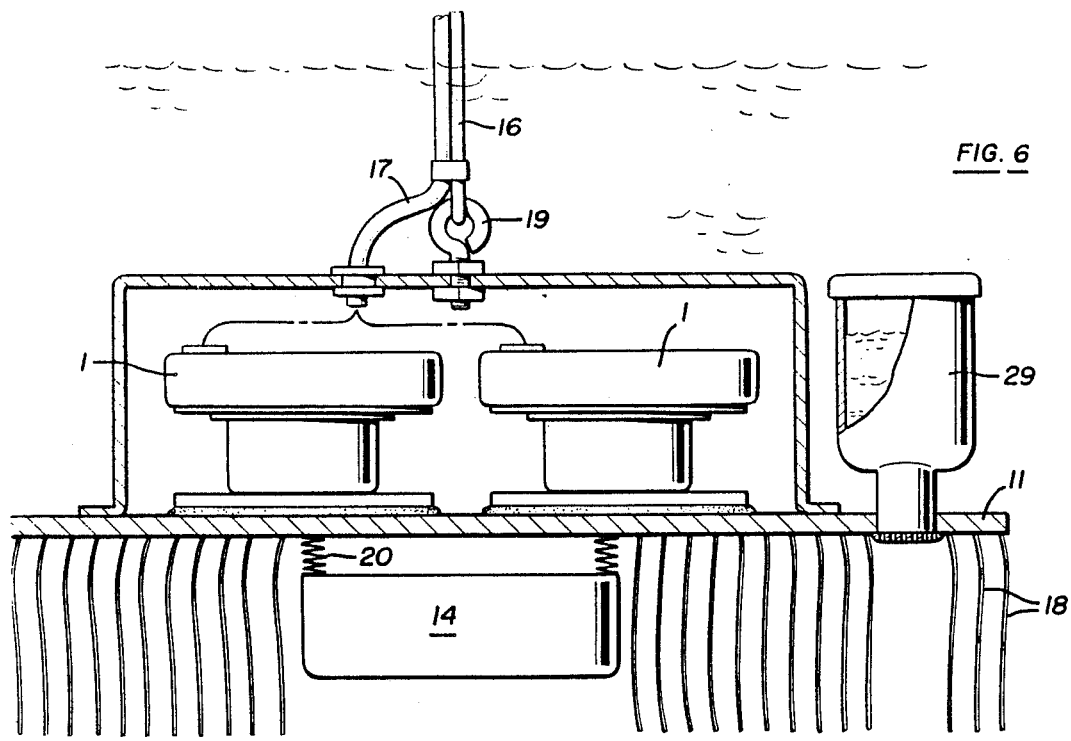
FIG. 6 is a view of the invention showing an embodiment with multiple transducers.

FIG. 6 shows a fish attractor having two or more transducers 1 connected to a common sounding board 11 for additional sound power output. In addition, it may have a dispenser 29 for dispensing chumming oil or other fish-attracting substance.

Figure 8:
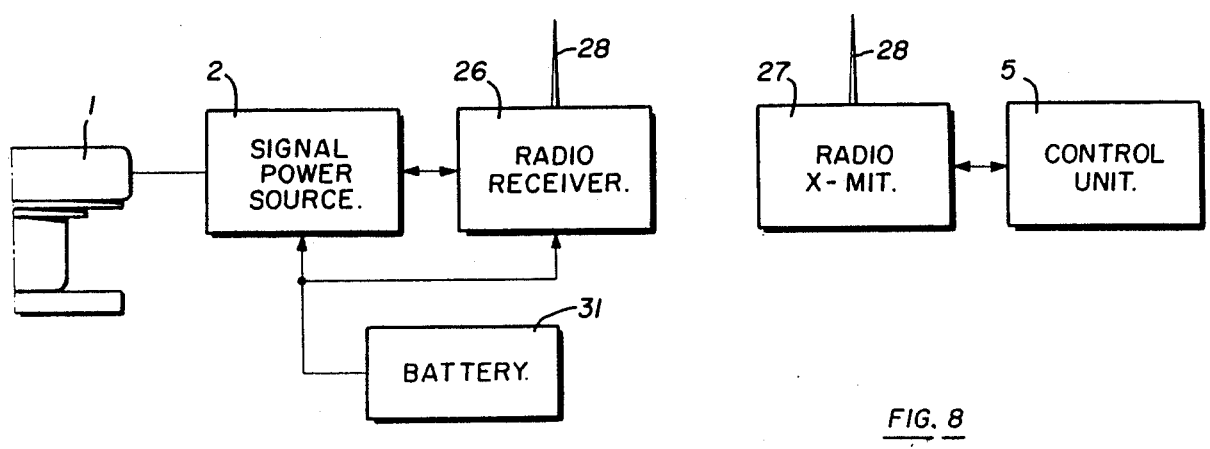
FIG. 8 is a block diagram of the invention showing a radio connection between boat and fish attractor.

FIG. 8 shows an arrangement wherein the electric cable 17 has been replaced with a radio connection consisting of a radio transmitter 27, with antenna 28 connected to the control unit 5, and a radio receiver 26 also with an antenna 28, in wireless communication with the transmitter 27. The radio receiver is connected to the signal power source 2 and a battery 31 provides power to the signal power source 2 and the radio receiver 26. In this arrangement the signal power source 2, radio receiver 26 and battery 31 are all colocated with the transducer 1 in the fish attractor assembly shown in FIG. 2, 3 or 6.

It is an important feature of the fish attractor according to the invention that all units described, including the signal power source 2, the control unit 5, the radio receiver 26, transmitter 27, battery 31 and transducer 1, may be interconnectable by means of plug-in cables terminated in waterproof jacks and plugs for easy assembly and maintenance.

I claim:

1. An electronic fish attractor comprising: at least one transducer for generating sound waves; a sounding board mechanically coupled to said transducer, and acoustically coupled to water containing the fish; a transfer plate disposed between said transducer and said sounding board; a low frequency electric wave power source for generating low frequency electric wave energy connected to said transfer plate via said transducer; a float chamber for floating the fish attractor in water; means for attaching a towing line to the attractor, a ballast attached to the attractor, said ballast being of a weight less than the buoyancy of the attractor including the buoyancy of the float chamber for maintaining the attractor floating in upright position in water, and including seaweed-like appurtenances to the attractor.

2. An electronic fish attractor comprising: at least one transducer for generating sound waves; a sounding board mechanically coupled to said transducer, and acoustically coupled to water containing the fish; a transfer plate disposed between said transducer and said sounding board; a low frequency electric wave power source for generating low frequency electric wave energy connected to said transfer plate via said transducer; a float chamber for floating the fish attractor in water; means for attaching a towing line to the attractor; a ballast attached to the attractor, said ballast being of a weight greater than the buoyancy of the attractor including the buoyancy of the float chamber for maintaining the attractor in upright suspended position below the surface of the water; means for attaching a suspension line to the attractor, and means for attaching seaweed like appurtenances to the attractor.

3. An electronic fish attractor according to claim 1 wherein said means for attaching a towing line includes an electric cable for connecting said transducer to said low frequency wave power source.

4. An electronic fish attractor comprising: at least one transducer for generating sound waves; a sounding board mechanically coupled to said transducer, and acoustically coupled to water containing the fish; a transfer plate disposed between said transducer and said sounding board; a low frequency electric wave power source for generating low frequency electric wave energy connected to said transfer plate via said transducer; a float chamber for floating the fish attractor in water; means for attaching a towing line to the attractor; a ballast attached to the attractor, said ballast being of a weight greater than the buoyancy of the attractor including the buoyancy of the float chamber for maintaining the attractor in upright suspended position below the surface of the water; means for attaching a suspension line to the attractor; wherein said means for attaching a suspension line includes an electric cable for connecting said transducer to said low frequency power source.

5. An electronic fish attractor comprising: at least one transducer for generating sound waves; a sounding board mechanically coupled to said transducer, and acoustically coupled to water containing the fish; a transfer plate disposed between said transducer and said sounding board; a low frequency electric wave power source for generating low frequency electric wave energy connected to said transfer plate via said transducer; a float chamber for floating the fish attractor in water; means for attaching a towing line to the attractor; a ballast attached to the fish attractor for sinking the attractor; means for attaching a suspension line to the attractor for suspending the attractor below the water surface; and including at least one spring for attaching the ballast to the sounding board, said spring having a stiffness such that it resonates with the sounding board at a frequency corresponding to that of the low frequency electric wave power source connected to the transducer.

* * * * *